United States Patent [19]
Johnson et al.

[11] Patent Number: 5,461,504
[45] Date of Patent: Oct. 24, 1995

[54] OPTO-ELECTRONIC CIRCUITS

[75] Inventors: Peter T. Johnson; Nigel R. Wood, both of Northants, England

[73] Assignee: GPT Limited, United Kingdom

[21] Appl. No.: 210,667

[22] Filed: Mar. 18, 1994

[30]  Foreign Application Priority Data

Mar. 24, 1993 [GB]   United Kingdom ............... 9306136

[51] Int. Cl.⁶ ................................................ H04B 10/00
[52] U.S. Cl. .................... 359/152; 359/156; 359/192; 385/39
[58] Field of Search ................... 359/114, 122, 359/143, 152, 156, 163, 192, 117; 372/18; 385/14, 15, 39

[56]  References Cited

U.S. PATENT DOCUMENTS 4,682,323  7/1987  Corfield et al. ................ 359/139
4,904,036  2/1990  Blonder ............................ 385/14
5,237,441  8/1993  Nhu .................................. 359/163

Primary Examiner—Leo H. Boudreau
Assistant Examiner—Kinfe-Michael Negash
Attorney, Agent, or Firm—Kirschstein, et al.

[57]  ABSTRACT

For use in a coherent optic switch a coherent optical transceiver has a single coherent receiver for both data recovery and to lock the transmitter to an optical reference input to the receiver. The switch may include polarisation control of the optical input to the receiver and wave division multiplex control of the transmitter frequency. The transmitter and receiver may be constructed as opto-electronic integrated circuits.

4 Claims, 6 Drawing Sheets

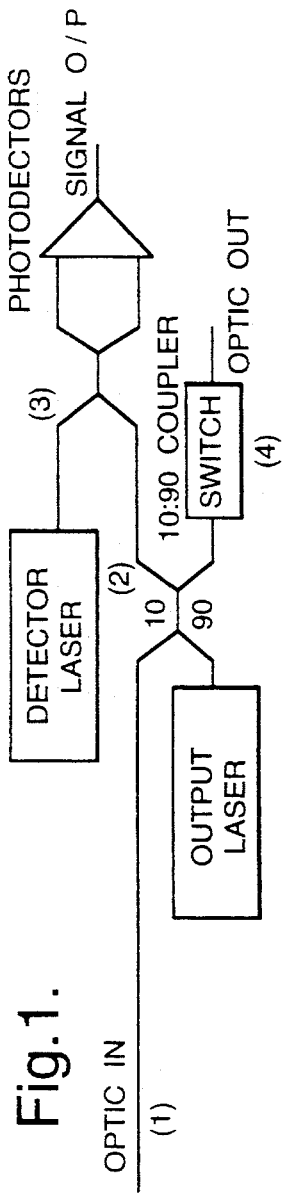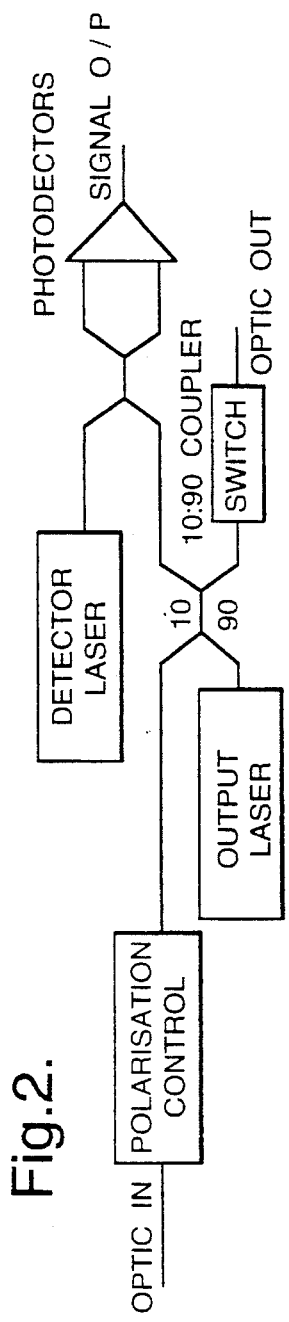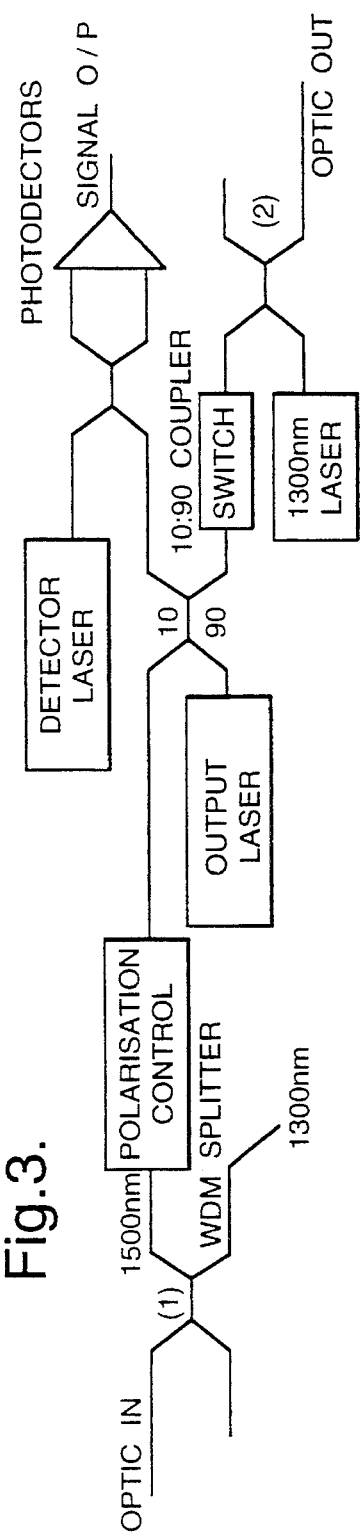

Fig.5A.
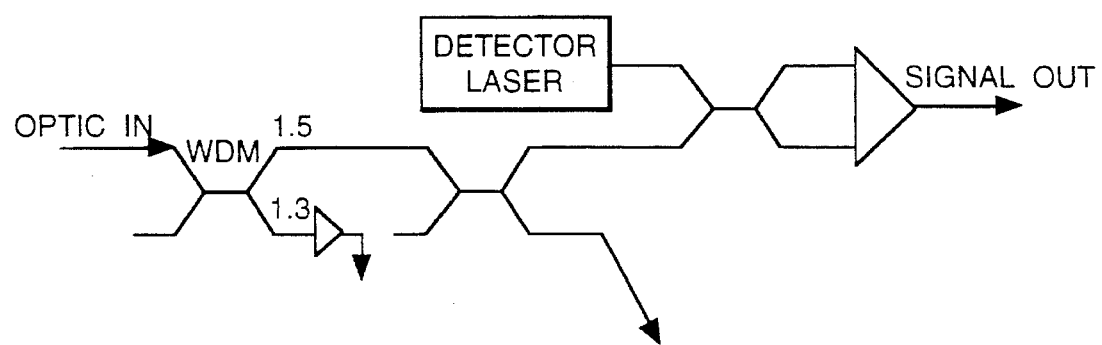
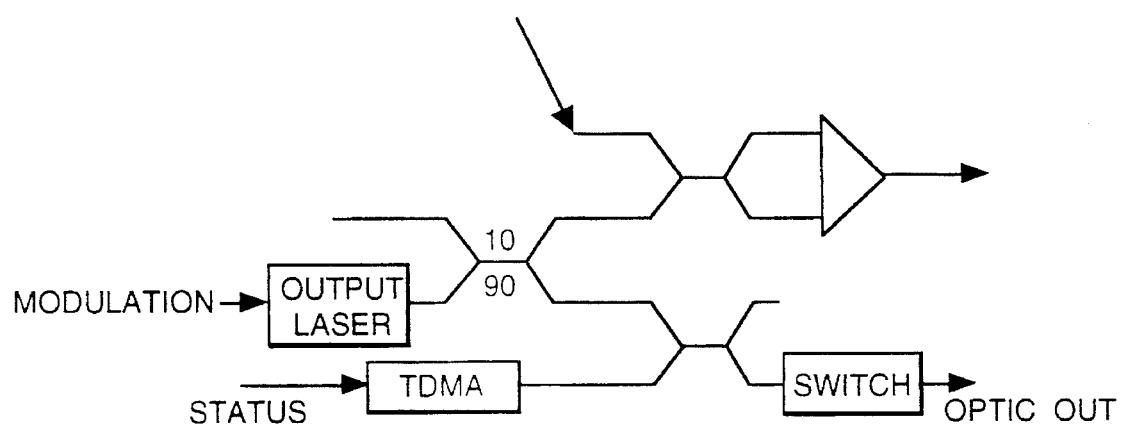
Fig.5B.

OPTO-ELECTRONIC CIRCUITS

BACKGROUND OF THE INVENTION

1. Field of the Invention

No-Electronic Integrated Circuit (OEIC) is described such as may be used in Coherent Optical Switch (COS) systems, for example as described in co-pending application No. GB 9220592.1 entitled "Optic Switching". The OEIC greatly simplifies the coherent transceivers used to construct large port count optical switches based on coherent optical transmission. The OEIC also has the potential to be used in any coherent based optical transmission system requiring a transceiver function, not just coherent based switches.

2. Description of the Prior Art

In existing coherent based optical communication systems two lasers are required, one used as the coherent transmitter, the other being used as the local oscillator within the coherent receiver. The local oscillator is used as in a radio super-heterodyne receiver to tune into the coherent transmission channel. In multi-channel systems the local oscillator is used to select one of the many channels being simultaneously transmitted. Both the channel frequency and the inter-channel spacing of the transmitted channels need to be accurately controlled and stabilised.

The selectivity of coherent systems allows the formation of a switching function. A signal is transmitted on a given coherent channel. The 'switching' function is performed by the destination port (coherent receiver) tuning into this source.

Some switch designs require a fully distributed switch architecture in which transmitter and receiver nodes can be located anywhere. In some architectures each transmitter and receiver pair are required to be located together. A realistic means of wavelength management of the transmitter laser is by use of an optical reference generated by a central management unit and fed to the transmitter via the same optical fibre link. This optical reference is tuned to the optical frequency of the transmitter it is controlling. A proportion of the transmitter signal power is used to act as a 'local oscillator' and is mixed with the optical reference in the photodetectors to produce an electrical Intermediate Frequency (IF). Thus, using Automatic Frequency Control (AFC) techniques the transmit laser can be 'locked' to this optical reference at a certain frequency 'offset'.

The optical reference can either be present always or the transmitter laser be left to 'free run', being 'nudged' back onto channel at set intervals. A further technique uses a direct detection link to transmit frequency correction information derived by a optical frequency monitor unit co-located with the central management unit. In this case the transmitter is 'started-up' using the optical reference. Once "on channel", periodic frequency corrections are transmitted to the transmitter using a Wave Division Multiplexing (WDM) direct detection overlay link.

SUMMARY OF THE INVENTION

According to the present invention there is provided a coherent optical transceiver comprising a coherent transmitter for data transmission and a single coherent receiver used for both data recovery and to lock the transmitter to an optical reference input to the transceiver.

BRIEF DESCRIPTION OF THE DRAWINGS

The present invention will now be described, by way of example, with reference to the accompanying drawings, in which:

FIG. 1 is a simplified schematic diagram of a COS transceiver OEIC;

FIG. 2 is a schematic diagram similar to FIG. 1 of a COS transceiver OEIC with polarisation handling;

FIG. 3 is a schematic diagram similar to FIG. 1 of a COS transceiver OEIC with polarisation handling and WDM control;

FIG. 5 is a schematic diagram of a port unit as shown in FIG. 4, showing the division into two OEICs;

DETAILED DESCRIPTION OF THE INVENTION

Figure 4:
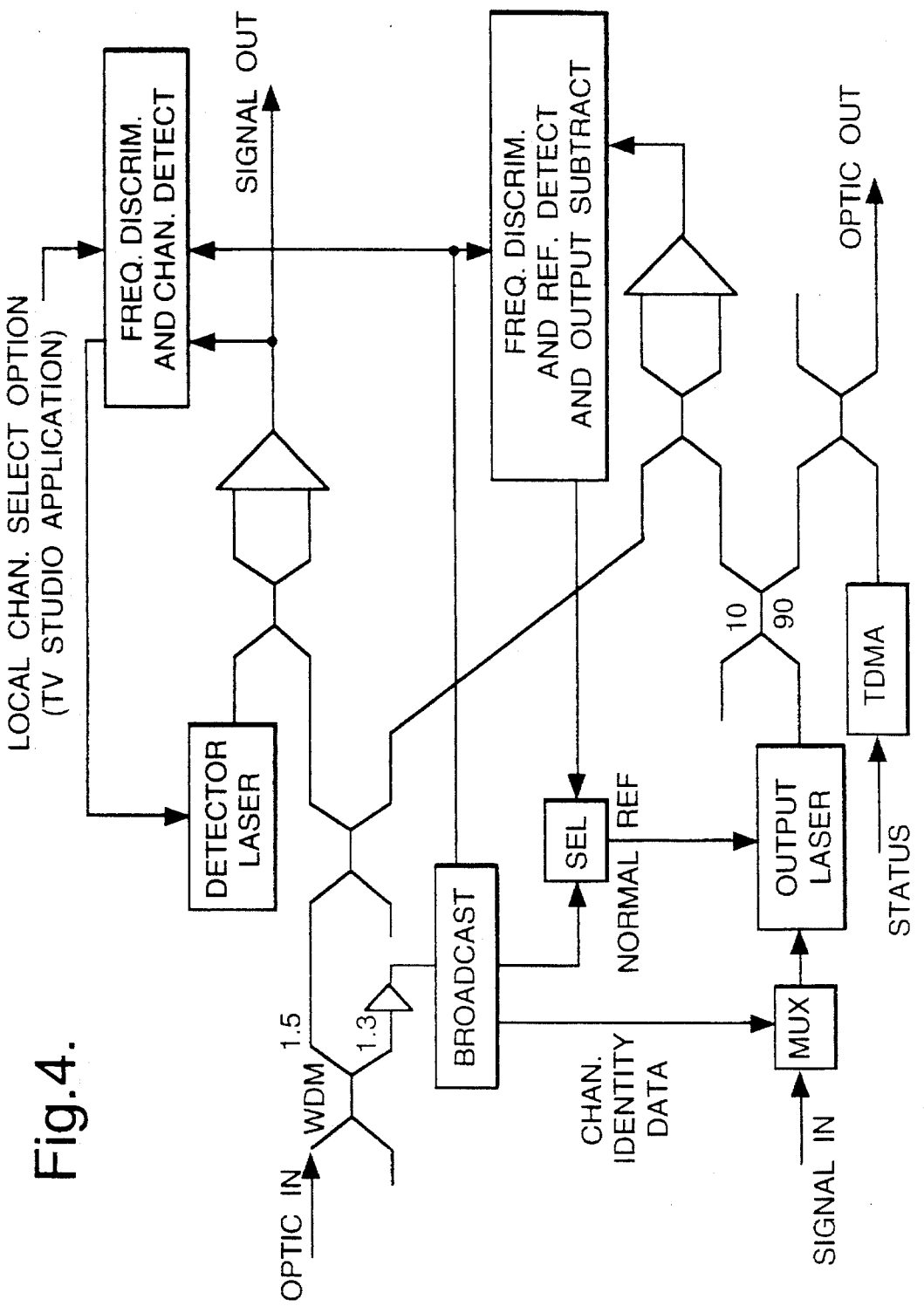
FIG. 4 is a schematic diagram of a prior an general port unit.

At a switching node as currently used, the functional elements required are a coherent receiver for data recovery, a coherent transmitter for data transmission, and a separate coherent receiver used to lock the transmitter to the optical reference. If the same receiver were used to detect the required signal and to lock the transmitter to the optical reference there would be a great simplification of both the optical and electrical components required e.g.: a reduction in the number of electrical amplifiers, demodulation circuits, and optical couplers. This also benefits the system in that due to the removal of unnecessary couplers and optical interfaces less optical signal is lost and hence an increase in receiver sensitivity is obtained. The benefit of the present invention lies in an approach which does use a common receiver and embodies maximum commonalty of components.

FIG. 1 shows a simplified schematic of the OEIC design. The OEIC has the functionality of both a coherent receiver and a coherent transmitter. Firstly there is the receiver function. The optical input 1 passes through the first coupler 2 and onto the second coupler 3 with only a ten percent drop in power as a 10:90 coupler is used. The optical signal is then combined with the local oscillator laser (detector laser) and detected using the photodetectors, allowing the incoming data to be recovered. Secondly there is the transmitter function. The output of the transmitter laser (Output Laser) passes through coupler 2 with only a ten percent drop in power. The remaining ninety percent is transmitted onto the optical network. The ten percent proportion of the transmitted signal is detected by the photodetectors and is used to lock the coherent transmitter to an optical reference, which also is fed via the optical input 1.

One of the major problems of an optical switch is stabilisation of the transmitter channels. This is achieved in this design in the following fashion. Whilst the transmitter laser is to be adjusted in wavelength to the required channel, the optical output is switched off using the optical switch 4 of FIG. 1. An optical reference of the correct wavelength is provided by the central management unit via the optical input 1. Using the first coupler 2, this is mixed with the transmitter laser in a coherent fashion. When the transmitter wavelength is in band an electrical Intermediate Frequency (IF) is detected. This IF signal can be used to lock the transmitter to the reference using AFC techniques. At this point, the transmitter laser is on-channel, and the output can be switched on using the optical switch. This technique does require the detection of data to be inhibited whilst the detectors are used for wavelength stabilisation.

An alternative technique which does not require the receive function to be inhibited is the out-band system. This means that the receiver function continues as normal, and extra bandwidth in the electrical receiver is used to determine whether the transmitter laser is tuned into the optical reference signal.

To obtain optimum performance of the system, the polarisation of the optical signal needs to be the same as that of the local oscillator. Similarly, the transmitter laser needs to be in the same polarisation state as the optical reference. Therefore polarisation control of either both the lasers, or the optical input to the receiver is required. Control of the optical input is preferred because then only one polarisation handling function is required. This can be sited at the input to the OEIC, as in FIG. 2, in the form of active polarisation control, or polafisation scrambling/switching, or at the final coupler 3 in the form of polarisation diversity.

Once the coherent transmitter has been 'started-up' using the above technique of locking to an optical reference, maintaining the transmitter on channel is required. This can be achieved in two ways. The first is the use of the out-band system and uses the ability for the receiver to be detecting the signal data whilst the transmitter is locked to an optical reference. This implies that the optical reference is always present. This is viable, but requires either a separate optical reference per transmitter or sharing of the reference between a number of transmitters, which would require a higher receiver bandwidth. The second method uses a monitor system co-located with the central management unit which measures the optical frequency of the transmitter channels and determines the required frequency correction, if any. Using a direct-detection link using WDM techniques it is possible to transmit to each coherent transmitter its required frequency correction. This requires a WDM splitter 1 to be located at the optical input of the OEIC, as shown in FIG. 3. Using a separate transmitter laser 2, in FIG. 3, it would also be possible to return information back to the central management unit to allow customer request services or the passing of status information about the transmitter/receiver pair.

FIG. 4 shows a diagram of the general port unit described in Patent Application GB 9220592.1, essentially a transmitter/receiver pair (TRx) with a WDM overlay for control purposes. It is assumed that the overlay has a distinct wavelength difference from the coherent channels so that conventional WDM techniques can be used. It also is assumed that the coherent channels have a wavelength in the region of 1.55 μm, and that the overlay has a wavelength in the region of 1.3 μm. This is the most likely current arrangement because of the present availability of components, both in fibre and OEIC form.

The general port unit of FIG. 4 would allow the output of the transmit laser to be present in the Passive Optical network (PON) at all times. In the case of start-up of the transmitter, it would be necessary to inhibit this output because the transmit laser might interfere with other channels if it were not of the correct wavelength. This inhibition could be achieved by incorporation of an optical switch before, or even after, the WDM coupler. This could be included in the OEIC design. Also the polarisation handling required is not included in the general port unit, and this is discussed later.

Due to the complexity of integrating the whole unit into a single OEIC, it may be necessary to divide the unit into at least two OEICs. A natural division would be between the receiver and the transmitter sections of the unit. The necessary components that would have to be integrated into a receiver and transmitter unit are shown in FIG. 5. From FIG. 4 it can be seen that a connection is necessary between the OIECs in the form of an optical fibre. This would mean increased optical loss.

Figure 6A:
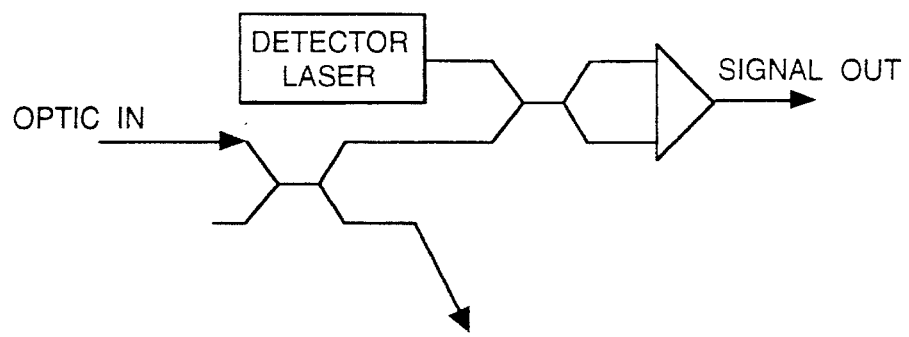
FIG. 6 shows a schematic diagram of a port unit divided into two OEICs without WDM overlay.
Figure 6B:
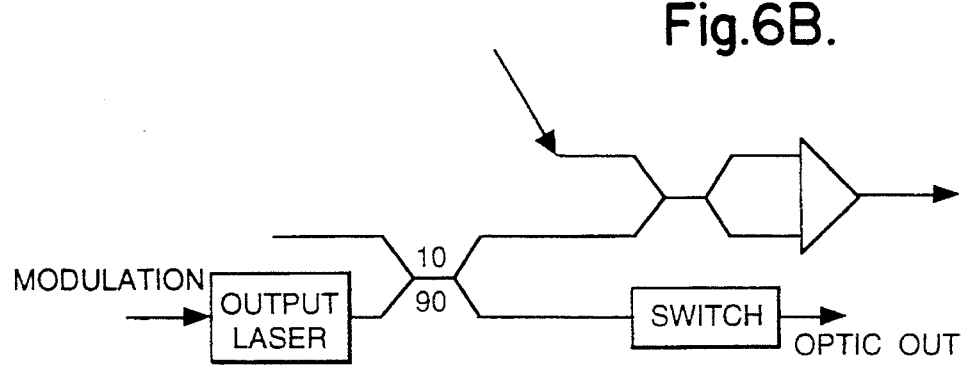

For the transmitter section, it is difficult, though technically possible, to integrate two lasers of significantly different wavelengths onto a single OEIC. Therefore it would probably be more practical to have a discrete 1.3 μm laser, and couple the output of the laser and that of the OEIC using a conventional fibre coupler. This coupler would then form the first stage splitting of the PON since both outputs are available. Alternatively the outputs could input to two PONs for security reasons. The reduced transmitter OEIC is shown in FIG. 6.

Figure 7:
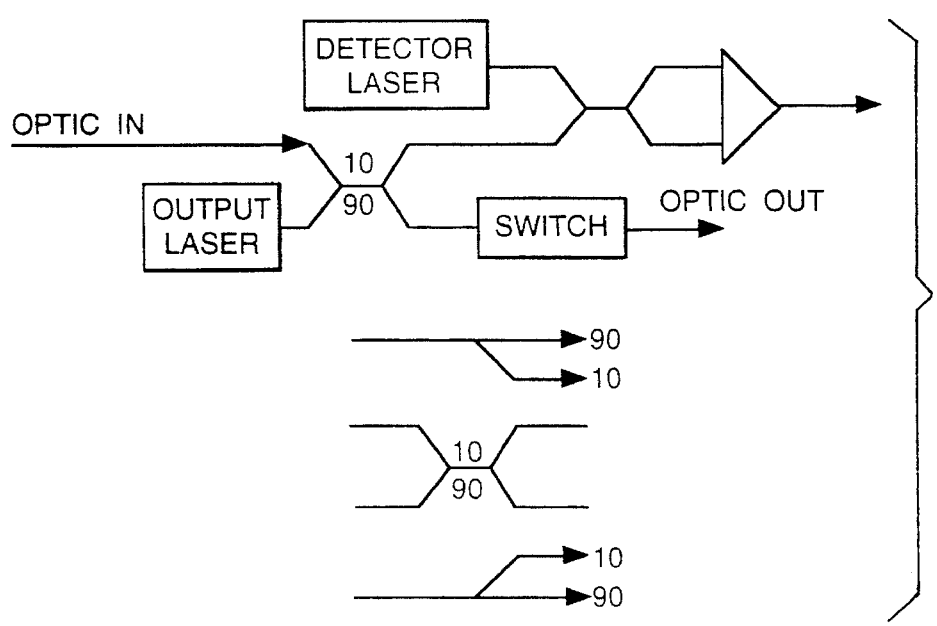
FIG. 7 shows a schematic diagram of a simplified transmitter/receiver OEIC.

The design of a combined receiver/transmitter (TRx) OEIC is shown in FIG. 7. The practicality of this arrangement is due to the symmetrical nature of the 10:90 splitter also illustrated in FIG. 7. For both inputs, ten percent is coupled to the cross-output, and ninety percent coupled to the through output. The operation of the design is as follows. For the receiver, the detector laser (local oscillator or LO) is combined with the incoming optical channels in the normal way. Ten percent of the input is coupled back into the PON to be recirculated, but because of the loss involved in a second loop of the PON, this will not affect operation. Similarly, ten percent of the transmitter light is coupled into the receiver during normal operation. However, the mixing of the output laser with the local oscillator and incoming light will not produce any detected signal within the bandwidth of the receiver. Therefore operation of the transmitter laser would be as normal.

For the purposes of the transmitter laser locking into an optical reference, the local oscillator is turned off, and the photodetector used to detect the correct locking. The turning off of the local oscillator would not be serious since realignment of the transmitter laser would only be necessary in the case of unit failure, in which case the receiver unit would not be initially operational anyway. If it was felt necessary to maintain operation of the receiver unit for any reason, e.g.: the mirror ODF, then the transmitter laser could be locked using the same receiver provided that it was locked outside the data bandwidth. This would mean a small increase in the channel spacing.

The WDM components could also be integrated onto the same OEIC. However, one problem remains with this and other designs, and that is matching the incoming optical polarisation to that of the transmitter or detector laser. This is necessary to ensure that the maximum electrical signal is maintained. The following section describes the various methods available to overcome this problem.

To maintain electrical signal strength at the coherent optical receiver, the polarisation states of the incoming optical signal, and the local oscillator or transmit laser, need to be matched. If the polarisation states are allowed to become orthogonal, extinction of the electrical signal will occur.

The methods used to overcome this problem for a coherent optical switch can be grouped into three main categories:

1. Polarisation maintaining switch fabric.
2. Active polarisation control.
3. Polarisation diversity.

For the polarisation maintaining switch fabric a transmission medium that maintains the polarisation state of the transmitted optical signal, from the optical transmitter to the optical receiver is used. Since the polarisation state of the transmitted signal would be known, and constant, at the optical receiver, the local oscillator polarisation state could be aligned with that of the incoming signal. This technique could be achieved with polarisation maintaining optical fibre in conjunction with either polarisation maintaining fibre couplers or more economically waveguide splitters.

The advantage of this technique is that the receiver would be the cheapest of the three techniques, though at extra expense for the switch fabric. Also, polarisation maintaining fibre can support two independent polarisation modes, so that the same switch fabric would have potentially twice the channel capacity as a network using conventional fibre.

Using active polarisation control, by monitoring the magnitude of the received electrical signal, the polarisation state of the input can be actively controlled to match that of the LO or transmit laser. This would require the use of a control algorithm, under computer control, to ensure adequate performance. The processing time would limit fast switching between channels to the order of 10 ms.

The polarisation control can be obtained by use of techniques including liquid crystal, fibre squeezers, fibre stretchers (polarisation maintaining fibre), retarder waveplates, but probably more importantly, waveguide polarisation controllers, which could be integrated into an OEIC.

For coherent optical switches using conventional fibre, and requiting faster switching speeds, polarisation diversity is necessary. This can be broken down into two areas:

a. Polarisation Processing.
b. Polarisation Switching.

The first technique is generally known as polarisation diversity. This is where the incoming signal is divided into its constituent polarisation components, say TE and TM with respect to the receiver structure. Each component, since it is then in a known state, can be processed separately. This means that twice the amount of electronics is required up until demodulation, whereafter the two polarisation channels can be combined, using an additional circuit which maintains the optimum signal to noise ratio, and which is known as a maximum ratio combiner.

The other technique involves switching and polarisation state of either the local oscillator or transmitter lasers, at a rate faster than the data rate. If the switching is correctly arranged, during a single bit period, the polarisation states will be matched for half the bit period. This results in a reduction of receiver sensitivity of 3 dB, and requires the use of a suitable polarisation switcher.

A similar technique known as data included polarisation switching (DIPS) uses a highly birefringent optical element, e.g.: a hight-birefringent fibre, to produce polarisation switching induced by the data dependent frequency shift. This technique requires a length of high-birefringent fibre of length of the order of two hundred metres. Since the fibre could be shared amongst transmitters this could provide an economic solution (common DIPS or CDIPS). However, this technique is suitable only for wide deviation FSK, CPFSK operation is not possible.

For the three data rates of interest, 155 MBit/s, 622 MBit/s, and 2.488 GBit/s, the preferred modulation formats are FSK, CPFSK, and CPFSK respectively. For all cases a completely polarisation maintaining fibre network is assumed to be impractical. CDIPS or other polarisation switching techniques may be useful for 155 MBit/s. These techniques become more difficult at higher data rates so the design is limited to active polarisation control or polarisation diversity. For an OEIC design, active polarisation control would mean that at the optical input to the OEIC a waveguide polarisation controller design would have to be made. This increases optical loss. Channel switching speeds of the order of 10 ms would be obtained. Also it would be difficult to control the polarisation of more than one input optical signal. Therefore it would not be possible to lock the detector into a channel and to lock the output laser into the optical reference simultaneously. However, the position of the controller would mean that the polarisation of the input signal and the optical reference could be controlled.

For the case of polarisation diversity, the coupler immediately prior to the photodetector would have to be replaced by four couplers, two polarisation splitting and two conventional 3 dB couplers. The output laser and the detector laser would also require a mode convertor each. Also, the number of photodetectors and subsequent electronics would have to be doubled, and a combining circuit for the two channels added. This technique would also increase the optical loss. Switching times for this technique are limited by the local oscillator switching times and the response time of the receiver circuitry, but careful design could produce channel switching speeds of the order of 10 µs.

In view of the extra high-speed electrical components required for polarisation diversity, active polarisation control will yield the most compact and economic solution. However, if faster channel switching times are required, then polarisation diversity will have to be used.

When the OEIC is required to recover a transmitted channel the LO frequency would be tuned to, and locked using A.F.C., Af from the required channel. The data can then be demodulated. The Tx laser of the OEIC is assumed to be operating on a channel not equal to the recovered channel. When the LO is required to select its own transmit laser it can do so within the OEIC since this would be greater than the optical signal from the PON. This would allow in-unit and on-board testing.

The photodetectors on the OEIC can be used to recover a transmitted channel using the LO, or used to tune the transmit laser into the correct wavelength using an optical reference from the PON. In normal operation the OEIC photodetectors would be used to recover a transmitted channel. When it is necessary to set the wavelength of the transmit laser, the LO would have to be turned off, or the transmit laser locked using some part of the receiver bandwidth not occupied by the transmitted channel. For most cases it would be acceptable to turn the LO laser off, except for one application; the ODF mirror where the subscriber port unit does not have either the TDMA transmitter or the BROADCAST receiver. In this case, the receiver bandwidth would be higher resulting in a necessary increase in the minimum channel spacing.

As an alternative, the problem of the mirror ODF can be solved in a fashion which allows the LO to be turned off. During normal operation, the simplified OEIC is fully functional as a mirror ODF. It is only when the transmit laser is required to tune into the optical reference that a problem occurs. This might occur on start-up of the unit, or if the transmit laser was reconfigured to operate on a different channel. The LO laser could be locked to a channel and the recovered section overhead (SDH) and an approximate position of the transmitter laser achieved. The LO could then be turned off, and the transmit laser locked into the optical reference. The data contained on the optical reference would then confirm that the transmit laser is in the correct position.

The modulation format for the data has been proposed as FSK for 155 MBit/s and CPFSK for higher STM-N data rates. For the purpose of tuning the transmit laser to the correct wavelength, the optical reference must be able to transmit an unique ID code for the Tx unit. The data rate of this modulation must be high enough to accommodate the channel ID data. In view of the stringent requirements on laser linewidth and FM performance at low data rates, it is recommended that data rates below 10 MBit/s are not used. The use of higher data rates which allow relaxations on both laser linewidth and FM-performance requirements requires larger optical channel bandwidths, and an increase in the channel spacing. This might require the optical tuning range to be increased or a reduction in the number of channels. Therefore a suggested data rate for the optical reference is 16 MBit/s FSK.

For the case where the 10 is turned off whilst the transmit laser is tuned to the correct wavelength, the frequency deviation of the 16 MBit/s optical reference could be made sufficiently large so that the 622 MBit/s data discriminator could be used to demodulate it. This is attractive because the same AFC circuitry as used to lock the LO laser could be used to lock the transmit laser to the optical reference. For the case where the LO was required to be on, then the optical reference would have to be locked outside the data bandwidth. The increase in channel spacing would be kept small by using a modulation index of between 4–8 so that the optical bandwidth of the optical reference was between 80–140 MHz. For the case of using a modulation index of 5, the channel spacings are derailed below

| Data rate (MBit/s) | Mod. Index | Channel Sep. (GHz) | IF pos. (MHz) | Data BW (MHz) |
|---|---|---|---|---|
| 622 | 1.0 (CPFSK) | 4.5 | 1560 | +700 |
| 16 | 5.0 (FSK) | N/A | 520[1] | +80 |

If the IF position is decreased to 440 MHz a greater margin between the optical reference and the transmitter channel could be allowed.

Figure 8:
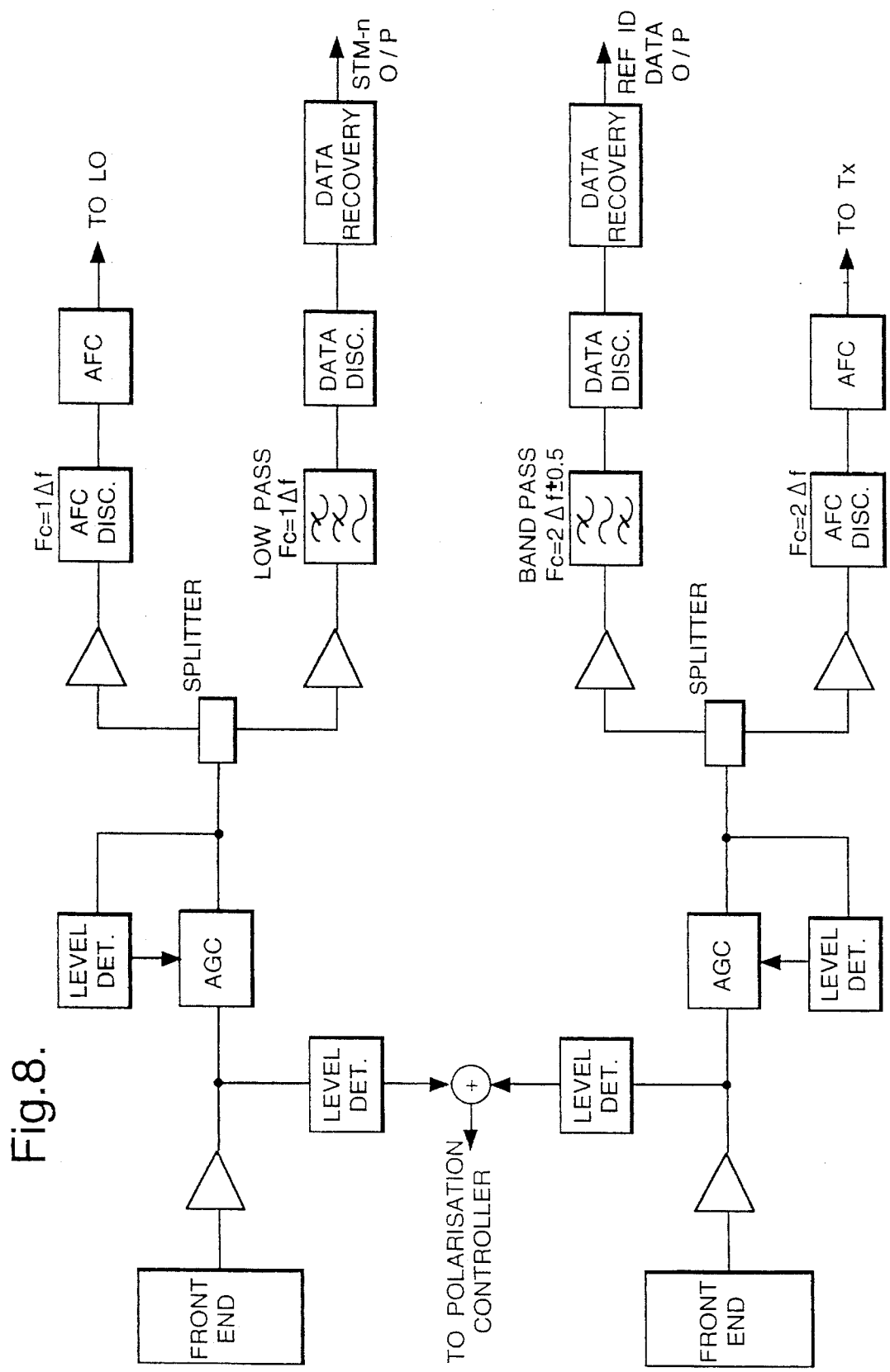
FIG. 8 shows a schematic diagram of the receiver electronics for a general port unit.

FIG. 8 shows a schematic of the receiver electronics for the general port unit. The two front-ends act almost independently, and this means that the receiver electronics cannot be shared.

Figure 9:
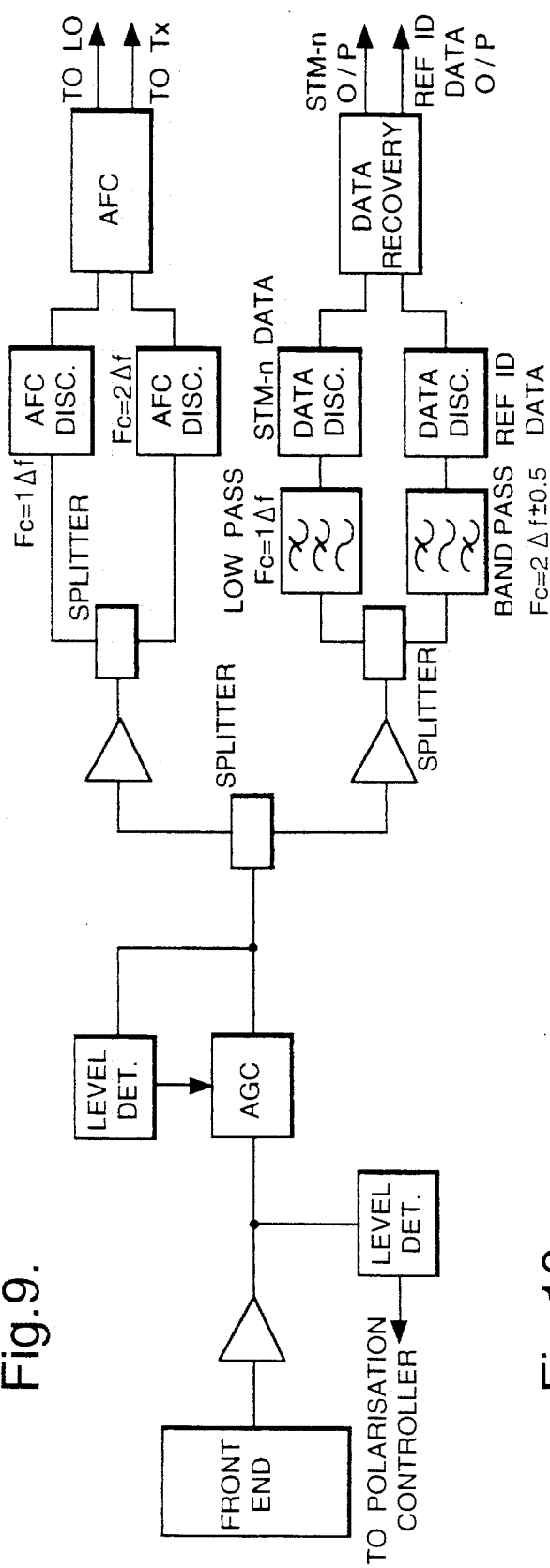
FIG. 9 shows a schematic diagram of the receiver electronics for a reduced transmitter/receiver OEIC.
Figure 10:
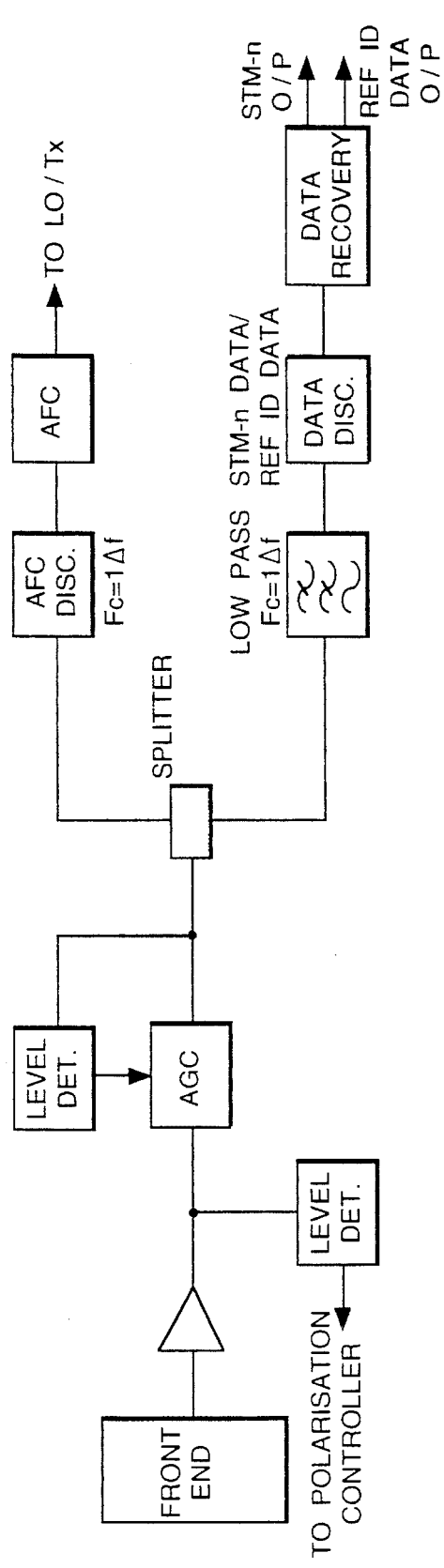
FIG. 10 shows a schematic diagram of the electronics for a reduced OEIC using a single data discriminator and AFC.

FIG. 9 shows a schematic of the receiver electronics for the simplified OEIC general port unit where the receiver front-end and electronics are shared. In this case, the complexity of the receiver is halved, a substantial saving in cost. The receiver of FIG. 9 must be 'dual functioned', ie: must allow the recovery of both STM-N data, and the reference ID data. This can be achieved by splitting the output of the front-end and using different bandwidths of the electrical domain to recover the data and the reference ID. An alternative is illustrated in FIG. 10. In this case, the same components are used to obtain AFC lock and to recover the data and channel ID. Of course, recovery of the data and channel ID cannot be done simultaneously in this case. However, by choosing the modulation index of the FSK channel ID information correctly, the same data discriminator can be used to recover the reference ID, and the subsequent electronics would need to recover both the STM-N data and the channel ID. Because the LO laser is assumed to be off whilst the transmit laser is locked into position the same AFC components could also be used to lock the transmit laser Δf from the optical reference. This would result in reduced channel spacing, since the AFC components at 2 Δf would be unnecessary.

What we claim is:

1. A coherent optical transceiver, comprising:

first and second optical couplers, each coupler having first and second inputs and first and second outputs, the first output of the first coupler being connected to the first input of the second coupler;

an optical input including incoming data and an optical reference connected to the first input of the first coupler;

a transmitter output laser connected to the second input of the first coupler;

a detector laser output connected to the second input of the second coupler;

photodetectors connected to the outputs of the second coupler, the optical input being combined with the detector laser output by the second coupler to form a combined signal which is fed to the photodetectors, and the incoming data being recovered from the optical input by the photodetectors; and the output laser being connected to the second output of the first coupler to provide an optical output, and to the photodetectors via the first output of the first coupler, the first input of the second coupler and the outputs of the second coupler to lock the coherent transmitter to the optical reference.

2. The transceiver as claimed in claim 1, and further comprising polarization control means connected to the optical input.

3. The transceiver as claimed in claim 1, and further comprising an optical switch for the optical input.

4. The transceiver as claimed in claim 1, and further comprising a wave division multiplex splitter for the optical input.

* * * * *